US008510012B2

(12) United States Patent
Amato et al.

(10) Patent No.: US 8,510,012 B2
(45) Date of Patent: Aug. 13, 2013

(54) ANTI-TAILGATING SYSTEM AND METHOD

(75) Inventors: William P. Amato, Avon, OH (US);
Kenneth A. Grolle, Elyria, OH (US);
Aaron M. Galbraith, Howell, MI (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 231 days.

(21) Appl. No.: 12/976,629

(22) Filed: Dec. 22, 2010

(65) Prior Publication Data

US 2012/0166057 A1    Jun. 28, 2012

(51) Int. Cl.
*B60T 7/12* (2006.01)

(52) U.S. Cl.
USPC ............. 701/96; 701/116; 340/435; 340/436

(58) Field of Classification Search
USPC ............... 701/70, 93–97, 116; 340/435, 436, 340/438
See application file for complete search history.

(56) References Cited

U.S. PATENT DOCUMENTS

| | | | |
|---|---|---|---|
| 4,706,195 A | 11/1987 | Yoshino et al. | |
| 4,982,805 A | 1/1991 | Naitou et al. | |
| 5,019,986 A | 5/1991 | Londt et al. | |
| 5,161,629 A * | 11/1992 | Wang | 177/208 |
| 5,166,681 A * | 11/1992 | Bottesch et al. | 340/933 |
| 5,436,835 A * | 7/1995 | Emry | 701/70 |
| 5,629,851 A | 5/1997 | Williams et al. | |
| 5,678,650 A | 10/1997 | Ishihara et al. | |
| 5,781,103 A * | 7/1998 | Gilling | 340/441 |
| 5,839,435 A | 11/1998 | Matsuoka et al. | |
| 5,839,534 A | 11/1998 | Chakraborty et al. | |
| 5,868,214 A | 2/1999 | Workman | |
| 6,116,369 A | 9/2000 | King et al. | |
| 6,240,346 B1 * | 5/2001 | Pignato | 701/33.4 |
| 6,263,282 B1 * | 7/2001 | Vallancourt | 701/301 |
| 6,285,945 B1 | 9/2001 | Sielagoski et al. | |
| 6,418,370 B1 * | 7/2002 | Isogai et al. | 701/96 |
| 6,643,578 B2 * | 11/2003 | Levine | 701/70 |
| 6,691,015 B1 * | 2/2004 | Levine | 701/70 |
| 6,721,644 B2 * | 4/2004 | Levine | 701/70 |
| 6,769,504 B2 * | 8/2004 | Kobayashi et al. | 180/169 |
| 6,785,611 B2 * | 8/2004 | Ibrahim | 701/301 |
| 6,854,550 B2 | 2/2005 | Gronau et al. | |

(Continued)

OTHER PUBLICATIONS

Sosa et al, Obstacles Detection and Collision Avoidance System Developed with Virtual Models, IEEE International Conference on Vehicular Electronics and Safety, 2007, pp. 1-8.*

(Continued)

*Primary Examiner* — Russell Frejd
(74) *Attorney, Agent, or Firm* — Calfee, Halter & Griswold LLP

(57) ABSTRACT

An anti-tailgating vehicle system includes a communication bus on a host vehicle, a forward vehicle sensor that senses a forward vehicle in front of the host vehicle, and an electronic control unit. The forward vehicle sensor transmits a forward vehicle message to the communication bus based on a distance to the forward vehicle. The electronic control unit receives the forward vehicle message from the communication bus and determines a relative speed between the host and forward vehicles based on the forward vehicle message. If the forward vehicle message indicates the host vehicle is not within a safe zone range relative to the forward vehicle while a host vehicle cruise control system is not engaged, the electronic control unit transmits a host vehicle control message to the communication bus for limiting a torque of the host vehicle.

19 Claims, 3 Drawing Sheets

(56) References Cited

U.S. PATENT DOCUMENTS

| | | | |
|---|---|---|---|
| 7,124,027 B1* | 10/2006 | Ernst et al. | 701/301 |
| 7,190,260 B2* | 3/2007 | Rast | 340/479 |
| 7,225,073 B2 | 5/2007 | Hedman et al. | |
| 7,321,819 B2 | 1/2008 | Seki | |
| 7,457,699 B2 | 11/2008 | Chia | |
| 7,554,435 B2* | 6/2009 | Tengler et al. | 340/436 |
| 7,602,311 B2* | 10/2009 | Price | 340/903 |
| 2002/0105423 A1* | 8/2002 | Rast | 340/479 |
| 2003/0154016 A1 | 8/2003 | Manaka | |
| 2006/0028328 A1* | 2/2006 | Cresse | 340/435 |
| 2008/0100428 A1* | 5/2008 | Price | 340/435 |
| 2008/0122652 A1* | 5/2008 | Tengler et al. | 340/902 |
| 2009/0219161 A1* | 9/2009 | Kocher | 340/576 |
| 2010/0125399 A1 | 5/2010 | Grolle | |
| 2011/0025484 A1* | 2/2011 | Mullick | 340/438 |
| 2011/0191000 A1* | 8/2011 | Grolle | 701/96 |
| 2011/0251768 A1* | 10/2011 | Luo et al. | 701/70 |
| 2011/0276216 A1* | 11/2011 | Vaughan | 701/29 |
| 2012/0119936 A1* | 5/2012 | Miller et al. | 342/60 |
| 2012/0122525 A1* | 5/2012 | Miller et al. | 455/569.2 |

OTHER PUBLICATIONS

Thammakaroon et al, Adaptive Brake Warning System for Automobiles, 8$^{th}$ International Conference on ITS Telecommunications, 2008, pp. 204-208.*

Lu et al, Truck Adaptive Following Distance Based on Threat Assessment Under Variable Conditions, Intelligent Transportation Systems, 2009, pp. 138-147.*

Seshagiri et al, Longitudinal Adaptive Control of a Platoon of Vehicles, Proceedings of the 1999 American Control Conference, 1999, pp. 3681-3685.*

Naranjo et al, ACC+Stop&Go Maneuvers with Throttle and Brake Fuzzy Control, IEEE Transaction on Intelligent Transportation Systems, vol. 7, No. 2, Jun. 2006, pp. 213-225.*

Kim et al, T. Observation of Real Driving Behavior in Car-Following: Preliminary Results, 2005 IEEE 61st Vehicular Technology Conference, Spring 2005, pp. 2939-2943.*

Bendix Wingman ACB Active Cruise with Braking Operator's Manual, BW2751, Bendix Commercial Vehicle Systems LLC, 2010.

* cited by examiner

ANTI-TAILGATING SYSTEM AND METHOD

BACKGROUND

The present invention relates to a vehicle control system. It finds particular application in conjunction with an anti-tailgating vehicle control system and will be described with particular reference thereto. It will be appreciated, however, that the invention is also amenable to other applications.

Adaptive control with braking (ACB) cruise control systems are used in vehicles for maintaining a safe relative distance between a host vehicle and forward vehicle. A torque of the host vehicle is adjusted by an ACB electronic control unit (ECU), based on a relative speed and/or relative acceleration of the host and forward vehicles, to adjust a speed of the host vehicle for maintaining the safe relative distance. ACB systems, like all cruise control systems, are active when the driver turns on the appropriate switch(es). Furthermore, like all cruise control systems, ACB systems allow the driver to apply the throttle over and above the amount of throttle being used for the cruise control function.

Collision mitigation (CM) systems operate to avoid or lessen the severity of an impact between a host and a forward vehicle using various combinations of transmission, vehicle retarder, and foundation brake controls. CM systems operate independently from the state of the ACB and/or cruise control switch(es). Also CM systems operate when the driver is applying the throttle above the amount of throttle requested by the ACB and/or cruise control system. CM systems may calculate that a collision is likely using a combination of relative speed, acceleration, and/or distance. For example if the host vehicle approaches a forward vehicle at a high relative speed and close distance, a collision may be likely and the CMS system may react.

A vehicle equipped with ACB and a typical CM system may still slowly creep up on the forward vehicle until the traveling distance is not considered safe. For example, a small relative speed may cause the ECU to determine that the time to a collision with the forward vehicle is almost infinite, even if the distance between the host and forward vehicles is short enough that the host vehicle is considered to be tailgating the forward vehicle. The CM system may not react since the relative velocity is small. The ACB system may not react if it is switched off or if the driver is manually applying the throttle.

The present invention provides a new and improved anti-tailgating system and method.

SUMMARY

In one aspect of the present invention, it is contemplated that an anti-tailgating vehicle system includes a communication bus on a host vehicle, a forward vehicle sensor that senses a forward vehicle in front of the host vehicle, and an electronic control unit. The forward vehicle sensor transmits a forward vehicle message to the communication bus based on a distance to the forward vehicle. The electronic control unit receives the forward vehicle message from the communication bus and determines a relative speed between the host and forward vehicles based on the forward vehicle message. If the forward vehicle message indicates the host vehicle is not within a safe zone range relative to the forward vehicle while a host vehicle cruise control system is not engaged, the electronic control unit transmits a host vehicle control message to the communication bus for limiting a torque of the host vehicle.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
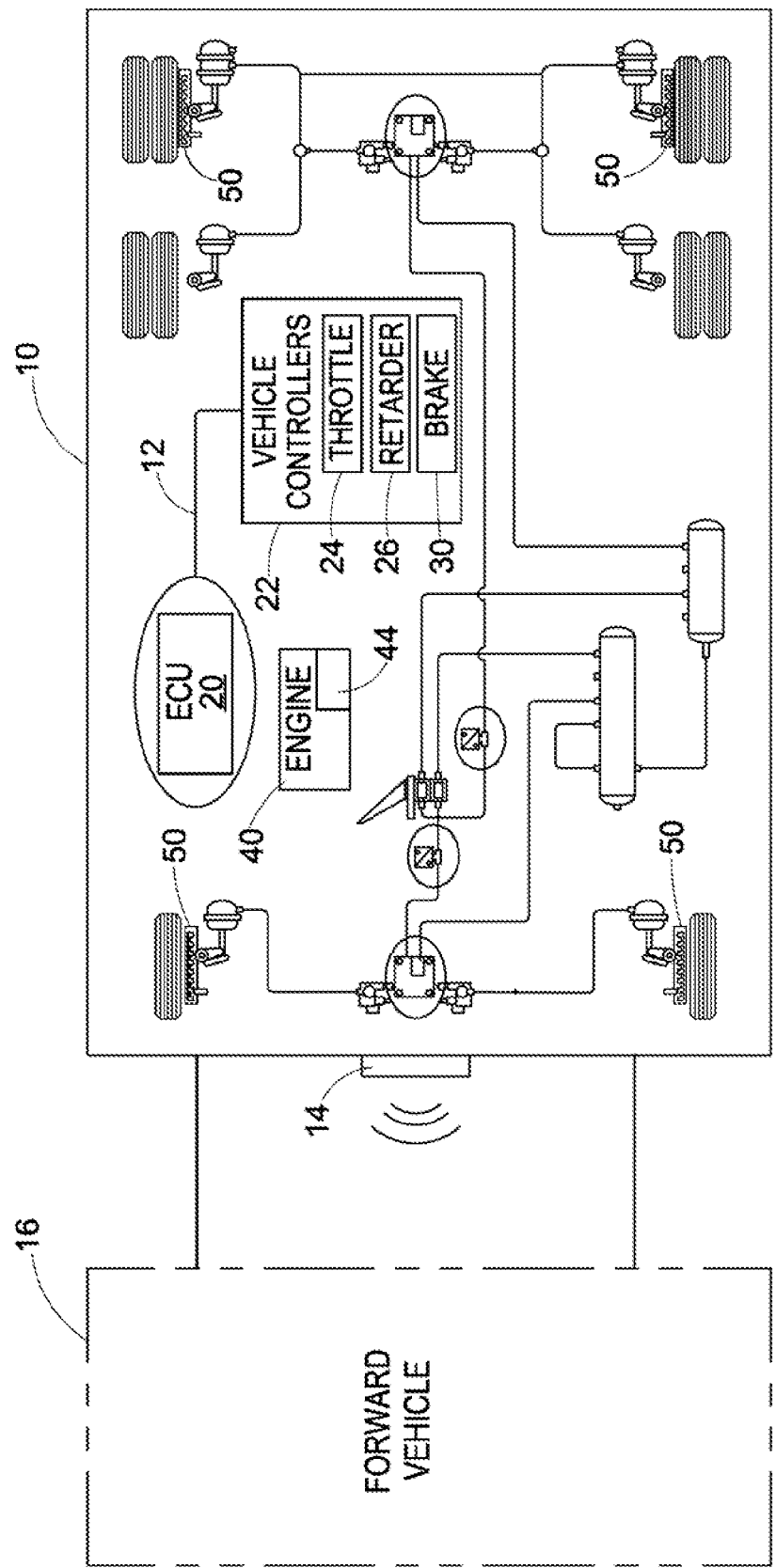
FIG. 1 illustrates a schematic representation of a host vehicle in accordance with one embodiment of an apparatus illustrating principles of the present invention.

With reference to FIG. 1, a simplified component diagram of an exemplary host vehicle 10 is illustrated in accordance with one embodiment of the present invention. The host vehicle 10 includes collision mitigation (CM) system (e.g., an anti-tailgating system). The host vehicle 10 includes a communication bus 12, which communicates with various sensors and control units on the host vehicle 10. A forward vehicle sensor 14, which is a radar-based sensor that senses a forward vehicle 16 in front of the host vehicle 10, communicates with the communication bus 12. The forward vehicle sensor 14 transmits a forward vehicle message to the communication bus 12 based on a distance (e.g., range) from the host vehicle 10 to the forward vehicle 16. An electronic control unit 20 also communicates with the communication bus 12. The ECU 20 receives the forward vehicle message from the forward vehicle sensor 14 via the communication bus 12 and determines a relative speed between the host vehicle 10 and the forward vehicle 16 based on the forward vehicle message. The ECU 20 transmits one or more messages to various vehicle controllers 22 (e.g., a vehicle throttle controller 24, a vehicle retarder controller 26 such as an engine retarder controller, a foundation brake controller 30, a driveline retarder controller, and/or some other vehicle controller), via the communication bus 12, for controlling one or more respective functions on the host vehicle 10 as a function of the distance between the host vehicle 10 and the forward vehicle 16. In one embodiment, the ECU 20 controls the respective functions on the host vehicle 10 to maintain a desired distance between the host vehicle 10 and the forward vehicle 16 (e.g., to maintain the forward vehicle 16 in a safe zone range 32 (see FIG. 2) in front of the host vehicle 10).

Figure 2:
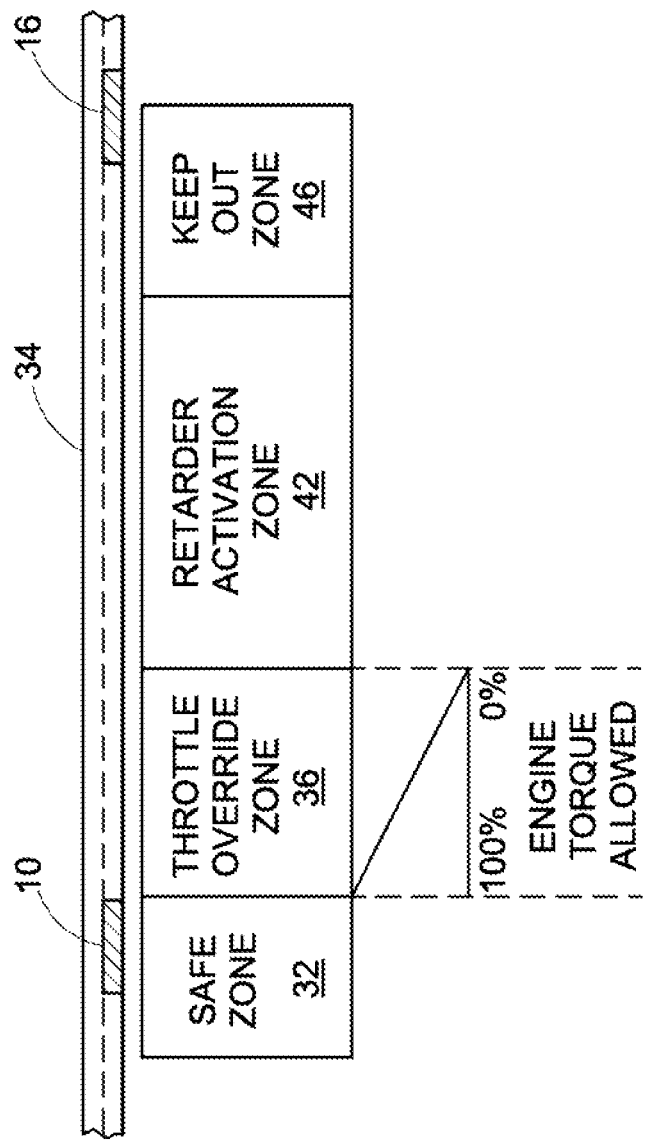
FIG. 2 illustrates a schematic representation of the host and forward vehicles with respect to the various zones of operation in accordance with one embodiment of an apparatus illustrating principles of the present invention.

FIG. 2 illustrates the host vehicle 10 traveling along a road 34 behind the forward vehicle 16. A distance from a front of the host vehicle 10 to the forward vehicle 16 determines a zone in which the host vehicle 10 is relative to the forward vehicle 16. For purposes of illustration, the host vehicle 10 is in the safe zone range relative to the forward vehicle 16. However, other relative positions between the host vehicle 10 and the forward vehicle 16 (e.g., when the host vehicle 10 is not in the safe zone range relative to the forward vehicle 16) will be discussed below with reference to FIG. 2. If the host vehicle 10 is in the safe zone range, it is determined that the host vehicle 10 is not tailgating the forward vehicle 16. If the host vehicle 10 leaves the safe zone range, it is determined that the host vehicle 10 is tailgating the forward vehicle 16. In this case, the ECU 20 transmits the one or more messages to the various vehicle controllers 22 (see FIG. 1) for controlling the one or more respective functions on the host vehicle 10 to increase the distance between the host vehicle 10 and the forward vehicle 16. In this manner, in one embodiment, the system described herein is an anti-tailgating system.

Figure 3:
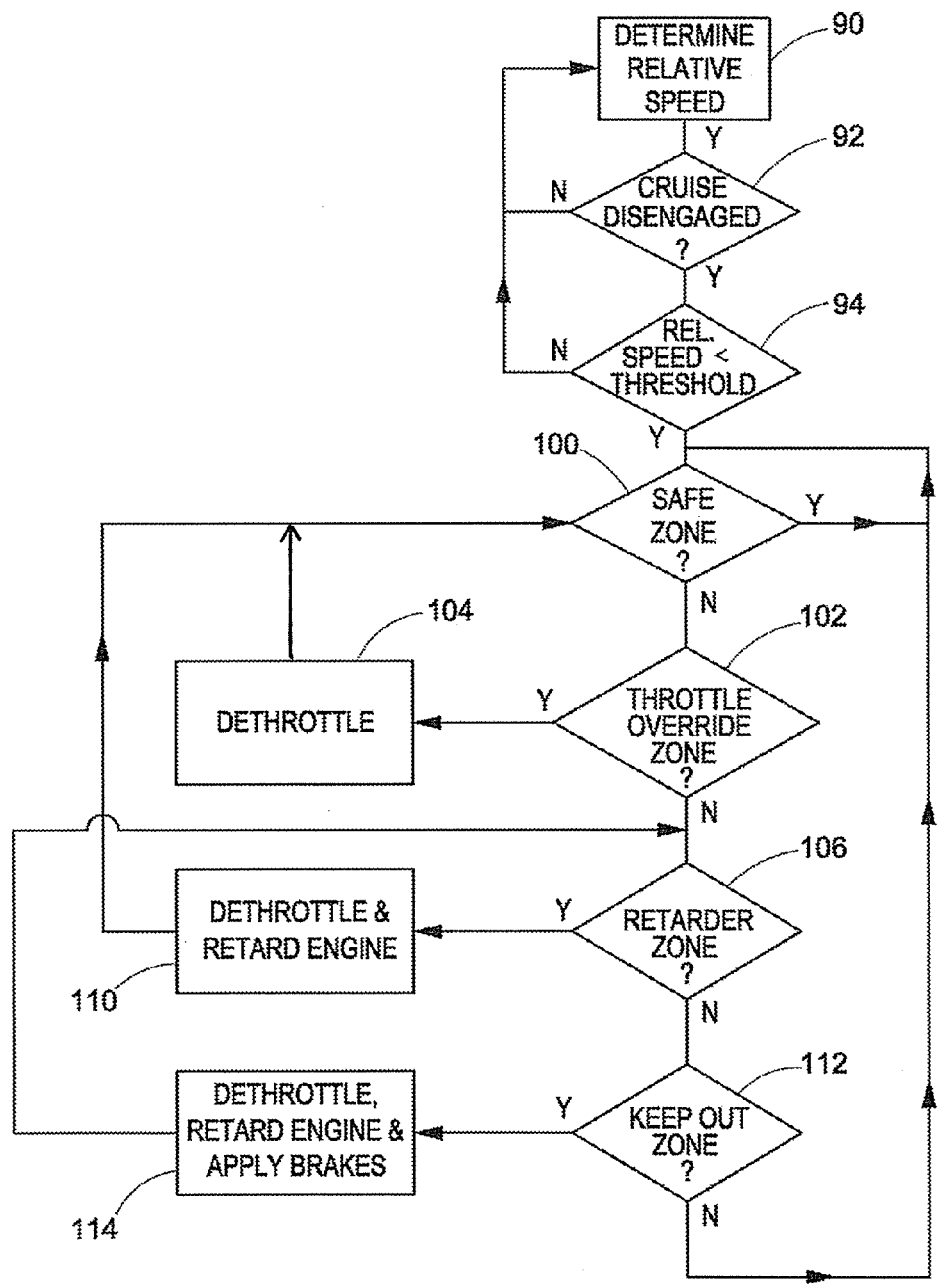
FIG. 3 is an exemplary methodology of avoiding and/or reducing tailgating in accordance with one embodiment illustrating principles of the present invention.

FIG. 3 is an exemplary methodology of preventing and/or reducing tailgating in accordance with one embodiment illustrating principles of the present invention.

With reference to FIGS. 1-3, the ECU determines, in a step 90, the relative speed between the host vehicle 10 and the forward vehicle 16 (as discussed above). Control then passes to a step 92 for determining if a vehicle cruise control system is disengaged. If the vehicle cruise control system is not disengaged, control returns to the step 90. Otherwise, if the vehicle cruise control system is disengaged, control passes to a step 94 for determining if the relative speed is below a predetermined threshold (e.g., 5 mph). If the relative speed is not below the predetermined threshold, control returns to the step 90. Otherwise, if the relative speed is below the predetermined threshold, control passes to a step 100 for determining if the host vehicle 10 is tailgating the forward vehicle 16 (and taking appropriate action if it is determined that a tailgating situation exists).

In the step 100, a determination is made if the host vehicle 10 is in the safe zone range 32 relative to the forward vehicle 16 (e.g., whether the forward vehicle 16 is >~16 m in front of the host vehicle 10). If the host vehicle 10 is in the safe zone range 32 relative to the forward vehicle 16, the host vehicle 10 is considered as not tailgating the forward vehicle 16. If the host vehicle 10 is in the safe zone range 32, control returns to a step 100 for continuing to monitor if the host vehicle 10 remains in the safe zone range 32 relative to the forward vehicle 16—in other words, no action is taken. For example, if a vehicle cruise control system (such as an adaptive cruise with braking cruise control system) is active, no additional action is taken by the ECU 20 to control the host vehicle 10.

If, on the other hand, the host vehicle 10 is not in the safe zone range 32 relative to the forward vehicle 16 (e.g., the forward vehicle 16 is ≦~16 m in front of the host vehicle 10), control passes from the step 100 to a step 102. In the step 102, a determination is made if the host vehicle 10 is in a throttle override zone range 36 relative to the forward vehicle 16 (e.g., whether the forward vehicle 16 is between ~12 m and ~16 m in front of the host vehicle 10). If it is determined in the step 102 that the host vehicle 10 is in the throttle override zone range 36 relative to the forward vehicle 16, control passes to a step 104 for transmitting a message from the ECU 20 to the vehicle throttle controller 24, via the communication bus 12, to de-throttle (e.g., limit torque) of an engine 40 of the host vehicle 10. In one embodiment, de-throttling the engine 40 prevents a vehicle operator from increasing the engine throttle above a predetermined level, as discussed in more detail below.

In one embodiment, the ECU 20 de-throttles the engine 40 based on the distance between the host vehicle 10 and the forward vehicle 16. For example, the ECU 20 proportionately de-throttles the engine 40 based on the distance between the host vehicle 10 and the forward vehicle 16. In this embodiment, the engine 40 is not de-throttled at all (e.g., 100% of engine 40 throttle is permitted) when the host vehicle 10 is at a start of the throttle override zone range 36 (e.g., a beginning threshold distance of the throttle override zone range 36, which is at a threshold between the safe zone range 32 and the throttle override zone range 36). The ECU 20 proportionately de-throttles the engine 40 until the engine 40 is completely de-throttled (e.g., 0% of engine 40 throttle is permitted) when the host vehicle 10 is at an end of the throttle override zone range 36 (e.g., an end threshold distance of the throttle override zone range 36, which is at a threshold between the throttle override zone range 36 and a vehicle retarder zone range 42, which is discussed in more detail below). In other words, the ECU 20 transmits messages to the vehicle throttle controller 24, via the communication bus 12, to increasingly limit the torque of the engine 40 as the distance between the host vehicle 10 and the forward vehicle 16 decreases. After de-throttling the engine 40 in the step 104, control returns to the step 100 for determining if the host vehicle 10 has returned to the safe zone range 32.

If it is determined in the step 102 that the host vehicle 10 is not in the throttle override zone range 36 relative to the forward vehicle 16, control passes to a step 106 for determining if the host vehicle 10 is in the engine retarder zone range 42 relative to the forward vehicle 16 (e.g., whether the forward vehicle 16 is between ~6 m and ~12 m in front of the host vehicle 10). If it is determined in the step 106 that the host vehicle 10 is in the engine retarder zone range 42, control passes to a step 110. In the step 110, the ECU 20 transmits a message to the engine retarder controller 26, via the communication bus 12, to activate a vehicle retarder 44 (also referred to as an engine retarder and endurance brakes). In one embodiment, it is contemplated that the vehicle retarder is fully applied; however, other embodiments, in which the vehicle retarder is gradually applied and/or applied in stages (e.g., high, medium, and low) based on the distance between the host vehicle 10 and the forward vehicle 16), are also contemplated. In addition, in the step 110, the ECU 20 transmits a message to de-throttle the engine 40 (e.g., limit the torque of the engine 40). In one embodiment, it is contemplated that the ECU 20 transmits a message to substantially completely de-throttle the engine 40 in the step 110. Control then returns to the step 102 for determining if the host vehicle 10 is in the throttle override zone range 36 (e.g., if the host vehicle 10 has left the vehicle retarder zone range 42 and entered the throttle override zone range 36 or the safe zone range 32).

If it is determined in the step 106 that the host vehicle 10 is not in the vehicle retarder zone range 42, control passes to a step 112. In the step 112, the ECU 20 determines if the host vehicle 10 is in a keep out zone range 46 (e.g., whether the forward vehicle 16 is <~6 m in front of the host vehicle 10). If it is determined in the step 112 that the host vehicle 10 is in the keep out zone range 46, control passes to a step 114. In the step 114, the ECU 20 transmits a message to the vehicle retarder controller 26, via the communication bus 12, to activate the vehicle retarder 44. In addition, in the step 114, the ECU 20 transmits a message, via the communication bus 12, to de-throttle the engine 40 (e.g., limit the torque of the engine 40). In one embodiment, it is contemplated that the ECU 20 transmits a message to substantially completely de-throttle the engine 40 in the step 114. Also, in the step 114, the ECU 20 transmits a message, via the communication bus 12, to the brake controller 30 to apply foundation brakes 50 of the host vehicle 10 without operator intervention (e.g., to automatically apply the foundation brakes 50). In one embodiment, the message requests an acceleration of about −2 m/s$^2$. Control then passes to the step 106 for determining if the host vehicle 10 is in the vehicle retarder zone range 42 (e.g., if the host vehicle 10 has left the keep out zone range 46 and entered vehicle retarder zone range 42, the throttle override zone range 36, or the safe zone range 32).

As noted above, in one embodiment, the keep out zone range is <~6 m in front of the host vehicle 10. In that regard, it is contemplated that the keep out zone range may be zero (0)

m in front of the host vehicle 10. In that case, the host vehicle 10 will not enter the keep out zone range 46 until the host vehicle 10 actually comes into contact with the forward vehicle 16.

If it is determined in the step 112 that the host vehicle 10 is not in the keep out zone range 46, control returns to the step 100.

It is to be understood that the ECU 20 described above may be part of a vehicle cruise control system (e.g., an adaptive control with braking (ACB) cruise control system). In this embodiment, the ECU 20 may control the various vehicle controllers 22 in response to ACB requests for slowing down/speeding up the host vehicle 10 to, for example, maintain a set speed of the host vehicle 10 while also maintaining a desired distance to the forward vehicle 16. The anti-tailgating system described above may remain "quiet" (e.g., take no action) as long as the cruise control system is active (e.g., engaged) and/or the host vehicle 10 remains in the safe zone range 32 (although the ACB may take action to reduce/increase the speed of the host vehicle 10 while in the safe zone range 32). The anti-tailgating system may become active if the ACB is disengaged or disabled by the vehicle operator. In other words, the anti-tailgating system may operate independently of the ACB, and continue to operate even if the ACB is disabled or turned-off by the operator.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An anti-tailgating vehicle system, comprising:
   a communication bus on a host vehicle;
   a forward vehicle sensor sensing a forward vehicle in front of the host vehicle, the forward vehicle sensor transmitting a forward vehicle message to the communication bus based on a distance to the forward vehicle;
   an electronic control unit receiving the forward vehicle message from the communication bus and determining a relative speed between the host and forward vehicles based on the forward vehicle message, if the forward vehicle message indicates the host vehicle is not within a safe zone range relative to the forward vehicle while the host vehicle cruise control system is not engaged and while the relative speed is less than a predetermined threshold, the electronic control unit transmitting a host vehicle control message to the communication bus for limiting a torque of the host vehicle.

2. The anti-tailgating vehicle system as set forth in claim 1, wherein:
   if the host vehicle is in a throttle override zone range relative to the forward vehicle, the electronic control unit transmits a message to the communication bus to limit the torque of the engine without activating a vehicle retarder and without applying foundation brakes of the host vehicle without operator intervention, based on the distance between the host vehicle and the forward vehicle.

3. The anti-tailgating vehicle system as set forth in claim 2, wherein:
   the electronic control unit transmits messages to the communication bus to increasingly limit the torque of the engine as the distance between the host vehicle and the forward vehicle decreases.

4. The anti-tailgating vehicle system as set forth in claim 3, wherein:
   the electronic control unit transmits a message to the communication bus to substantially not limit the torque of the engine when the host vehicle is at a beginning threshold distance of the throttle override zone range; and
   the electronic control unit transmits a message to the communication bus to substantially completely limit the torque of the engine when the host vehicle is at an end threshold distance of the throttle override zone range, the end threshold distance of the throttle override zone range being a shorter distance between the host vehicle and the forward vehicle than the beginning threshold distance of the throttle override zone range.

5. The anti-tailgating vehicle system as set forth in claim 1 wherein if host vehicle is in a vehicle retarder zone range relative to the forward vehicle:
   the electronic control unit transmits a message to the communication bus to activate a vehicle retarder of the host vehicle.

6. The anti-tailgating vehicle system as set forth in claim 5, wherein:
   the electronic control unit transmits a message to the communication bus to substantially completely limit the torque of the engine when the host vehicle is in the vehicle retarder zone range.

7. The anti-tailgating vehicle system as set forth in claim 5, wherein if the host vehicle leaves the vehicle retarder zone range and enters the throttle override zone range:
   the electronic control unit transmits a message to the communication bus to deactivate the vehicle retarder of the host vehicle; and
   the electronic control unit transmits a message to the communication bus to proportionately limit the torque of the engine based on the distance between the host vehicle and the forward vehicle.

8. The anti-tailgating vehicle system as set forth in claim 5, wherein if the host vehicle is in a keep out zone range relative to the forward vehicle:
   the electronic control unit transmits a message to the communication bus to activate a vehicle retarder of the host vehicle; and
   the electronic control unit transmits a message to the communication bus to apply foundation brakes of the host vehicle without operator intervention.

9. The anti-tailgating vehicle system as set forth in claim 8, wherein:
   the electronic control unit transmits a message to the communication bus to substantially completely limit the torque of the engine when the host vehicle is in the keep out zone range.

10. The anti-tailgating vehicle system as set forth in claim 9, wherein if the host vehicle leaves the keep out zone range and enters the vehicle retarder zone range:
    the electronic control unit transmits a message to the communication bus to no longer apply the foundation brakes of the host vehicle without operator intervention.

11. The anti-tailgating vehicle system as set forth in claim 1, wherein:
    the predetermined threshold is about 5 mph.

12. A method for reducing tailgating of a host vehicle, the method comprising:

sensing a forward vehicle in front of the host vehicle by a forward vehicle sensor;

determining a distance to the forward vehicle based on a forward vehicle message transmitted from the forward vehicle sensor;

determining a relative speed between the host and forward vehicles based on the forward vehicle message; and if the host vehicle is not within a safe zone range relative to the forward vehicle while the host vehicle cruise control system is not engaged and while the relative speed is less than a predetermined threshold, limiting a torque of the host vehicle.

13. The method for reducing tailgating of a host vehicle as set forth in claim 12, wherein if the distance to the forward vehicle indicates the host vehicle is in a throttle override zone range, the controlling step further including:

proportionately limiting the torque of the host vehicle based on the distance to the forward vehicle.

14. The method for reducing tailgating of a host vehicle as set forth in claim 12, wherein if the distance to the forward, vehicle indicates the host vehicle is in a vehicle retarder zone range, the controlling step including:

activating a vehicle retarder of the host vehicle.

15. The method for reducing tailgating of a host vehicle as set forth in claim 14, wherein if the distance to the forward vehicle indicates the host vehicle leaves the vehicle retarder zone range and enters a throttle override zone range, further including:

de-activating the vehicle retarder of the host vehicle.

16. The method for reducing tailgating of a host vehicle as set forth in claim 14, wherein if the distance to the forward vehicle indicates the host vehicle is in a keep out zone range, the controlling step including:

activating a vehicle retarder of the host vehicle; and activating foundation brakes of the host vehicle without operator intervention.

17. The method for reducing tailgating of a host vehicle as set forth in claim 16, wherein if the distance to the forward vehicle indicates the host vehicle leaves the keep out zone range and enters the vehicle retarder zone range, further including:

de-activating the foundation brakes of the host vehicle without operator intervention.

18. A method for reducing tailgating of a host vehicle, the method comprising:

sensing a forward vehicle in front of the host vehicle;

transmitting a forward vehicle message to a host vehicle communication bus based on a distance from the host vehicle to the forward vehicle;

receiving the forward vehicle message by an electronic control unit from the communication bus;

determining a relative speed between the host and forward vehicles based on the forward vehicle message; and if the forward vehicle message indicates the host vehicle is not within a safe zone range relative to the forward vehicle while the host vehicle cruise control system is not engaged and while the relative speed is less than a predetermined threshold, transmitting at least one of a plurality of a host vehicle control messages to the host vehicle communication bus for limiting a torque of the host vehicle.

19. The method for reducing tailgating of a host vehicle as set forth in claim 18, wherein:

if the distance to the forward vehicle indicates the host vehicle is within a throttle override zone range relative to the forward vehicle, the step of transmitting the at least one vehicle control message including:

transmitting a first of the vehicle control messages, for proportionately limiting a torque of the host vehicle based on the distance to the forward vehicle, to the communication bus;

if the distance to the forward vehicle indicates the host vehicle is within a vehicle retarder zone range relative to the forward vehicle, the step of transmitting the at least one vehicle control message further including:

transmitting a second of the vehicle control messages, for activating a vehicle retarder of the host vehicle, to the communication bus; and if the distance to the forward vehicle indicates the host vehicle is within a keep out zone range relative to the forward vehicle, the step of transmitting the at least one vehicle control message further including:

transmitting a third of the vehicle control messages, for activating a foundation brake of the host vehicle without operator intervention, to the communication bus.

* * * * *